(12) United States Patent
Franz et al.

(10) Patent No.: US 7,336,650 B2
(45) Date of Patent: Feb. 26, 2008

(54) ARRANGEMENT FOR THE PROVISION OF MESSAGES AND DIALOGUES IN PACKET NETWORKS

(75) Inventors: Mathias Franz, Berlin (DE); Alfred Jugel, Geretsried (DE); Patrick Kleiner, München (DE); Norbert Löbig, Darmstadt (DE); Klaus Pulverer, München (DE)

(73) Assignee: Siemens Aktiengesellschaft, Munich (DE)

( * ) Notice: Subject to any disclaimer, the term of this patent is extended or adjusted under 35 U.S.C. 154(b) by 421 days.

(21) Appl. No.: 10/488,327

(22) PCT Filed: Aug. 21, 2002

(86) PCT No.: PCT/EP02/09341

§ 371 (c)(1),
(2), (4) Date: Nov. 9, 2004

(87) PCT Pub. No.: WO03/021912

PCT Pub. Date: Mar. 13, 2003

(65) Prior Publication Data

US 2005/0073994 A1 Apr. 7, 2005

(30) Foreign Application Priority Data

Aug. 31, 2001 (DE) .................... 101 42 613

(51) Int. Cl.
*H04L 12/56* (2006.01)
*H04L 12/66* (2006.01)

(52) U.S. Cl. ............... 370/352; 370/355; 370/356; 370/397; 370/398

(58) Field of Classification Search ........ 370/352–360, 370/397–399
See application file for complete search history.

(56) References Cited

U.S. PATENT DOCUMENTS

| | | | |
|---|---|---|---|
| 6,747,979 B1 * | 6/2004 | Banks et al. ............... | 370/401 |
| 6,807,172 B1 * | 10/2004 | Levenson et al. .......... | 370/389 |
| 6,847,631 B1 * | 1/2005 | Lawser et al. ............. | 370/352 |
| 6,901,452 B1 * | 5/2005 | Bertagna .................... | 709/240 |
| 6,937,574 B1 * | 8/2005 | Delaney et al. ............ | 370/254 |
| 6,996,076 B1 * | 2/2006 | Forbes et al. ............... | 370/310 |
| 7,055,171 B1 * | 5/2006 | Martin et al. .................. | 726/3 |
| 2002/0075849 A1 * | 6/2002 | Tarle et al. ................. | 370/352 |
| 2002/0191572 A1 * | 12/2002 | Weinstein et al. .......... | 370/338 |
| 2004/0109460 A1 * | 6/2004 | Banks et al. ................ | 370/401 |

FOREIGN PATENT DOCUMENTS

| WO | WO 00/31933 A | 6/2000 |
|---|---|---|
| WO | WO 01/37501 A | 5/2001 |

* cited by examiner

*Primary Examiner*—Binh K. Tieu
(74) *Attorney, Agent, or Firm*—Bell Boyd & Lloyd LLP

(57) ABSTRACT

The invention relates to an exchange for a telecommunication network, with a message/dialogue device, whereby said message/dialogue device, comprises one interface each for a packet-oriented data transmission network and a line-oriented data transmission network and a virtual port for controlling the message/dialogue device, by means of a connection running through the packet-oriented data transmission network, for the transmission of messages and/or dialogues to a user.

18 Claims, 5 Drawing Sheets

ARRANGEMENT FOR THE PROVISION OF MESSAGES AND DIALOGUES IN PACKET NETWORKS

CROSS REFERENCE TO RELATED APPLICATIONS

This application is the U.S. National Stage of International Application No. PCT/EP02/09341, filed Aug. 21, 2002 and claims the benefit thereof. The International Application claims the benefits of German application No. 10142613.5 filed Aug. 31, 2001, both of the applications are incorporated by reference herein in their entirety.

FIELD OF INVENTION

The invention relates to an exchange for a telecommunications network, with a message/dialogue device for providing messages and/or dialogues to a subscriber.

BACKGROUND OF INVENTION

As shown in FIG. 1, a switching node generally comprises peripheral units LTG (line/trunk groups), a computer platform CP, a message buffer MB and additional central units such as a switching network SN, protocol termination units CCNC (i.e. for the signalling system no. 7), background memory MD and control equipment NC.

The peripheral units perform key switching tasks related to the voice channels on the peripheral units. They therefore contain switching, operating and administrative programs and programs relating to information for the unit, such as equipment number, signalling, authorisations, directory numbers, individual characteristics for trunk lines and subscriber connections as well as information on the installed capacity and configuration of the relevant peripheral units. The central computer platform provides coordinated control for setting up and clearing down connections and reacts to administrative and error-related configuration changes.

The peripheral units are linked via the message buffer to one another and to the computer platform. The other central system components provide special functions for the switching system such as through connecting voice channels, processing signalling protocols, providing the operator interface or buffering mass data.

For reliability, the central components in a switching system are of redundant design (i.e. duplicated). In general, the peripheral units are not of redundant design. In the event of strict reliability requirements (such as retaining stable connections in the event of failure of a peripheral unit) they may be of redundant design.

If signalling and voice are disassociated and routed on separate paths and if the peripheral units are only tasked with processing signalling and/or converting without physically terminating the voice channels, then there are no restrictions on the number of terminable voice channels. These logical peripheral units are designed for this application in terms of capacity, processor performance, buffer size and message interface capacity.

Since more than one direction must be available to through connect voice between an A-side subscriber or an A-side trunk (i.e. a connection to a remote exchange) and a B-subscriber or a B-side trunk, then generally two separate peripheral units PE are involved in setting up and clearing down connection, as shown in FIG. 2. The classic peripheral unit only terminates the trunks for which it is responsible for processing the switching. Usually there are peripheral facilities to terminate n PCM30 (pulse code modulation) routes (e.g. n=4 for 120 trunks).

In this application, in which the voice is routed outside the exchange, there are no restrictions on the maximum number of terminable trunks that can be physically determined. In this instance, a peripheral device can process more than 120 trunks simultaneously for example. A network scenario in which the exchanges are used for connections routed outside the exchange is shown in FIG. 3.

The exchange responsible for controlling the connections routed outside the exchange can provide the A and/or B-side subscribers of classic TDM networks (classic telephone network with time division multiplexing) with known subscriber or network features. This includes in particular messages and dialogues that are required in certain situations (e.g. "you have dialed an incorrect number, please try again", "the number has changed, please re-dial using 722-25940 or the query for authorisation to dial into a packet network).

In the classic case, in which the subscriber channel of the connection is routed into the exchange, these messages and dialogues can be provided by peripheral facilities equipped with the appropriate functions. If the subscriber data is however routed outside the exchange in a packet network, then an external system is often used (IVR, interactive voice response system). Alternatively, an existing TDM-based message system can also be used for packet network connections.

According to the prior art, known IVR systems are usually TDM-based (time division multiplex) and combine the entire range of functions to be universally useable. The disadvantage of this universality is however the costs incurred by the most effective use of an IVR system. In TDM-based data communications networks (e.g. the classic telephone network) with conventional exchanges, two usage scenario are used that are described below:

Firstly, peripheral units of the exchange are equipped with hardware modules to provide messages, DTMF (discrete tone multi-frequency) and/or voice recognition in the exchange. To play back a message or a dialogue, the subscriber/trunk is switched via a 64 kbit/s connection to a physical port of this special peripheral device for messages and dialogues.

From a switching point of view, this involves through connecting a trunk routed from an A-side peripheral device via the switching network to the B-side peripheral device with message and/or dialogue functionality. The B-side message/dialogue port acts like a B-side trunk. The type of message or dialogue functions to be played is determined by exchange-internal signalling to the peripheral device with message and/or dialogue functions or is pre-defined.

The advantage of this implementation lies in the integration of the message and/or dialogue functions in the exchange that is very cost-effective. Furthermore, there is broader access to the hardware functions of the peripheral facilities for message and/or dialogue functions.

The disadvantage of this implementation is if the subscriber channel is packet based or is routed outside the exchange, this function can either not be used or can only be used with a downstream media gateway that bridges the network gateway between the TDM-based data communications network (classic telephone network) and the packet network (e.g. internet).

Furthermore, the voice data, which according to the prior art is available in PCM/TDM technology (pulse code modulation/time division multiplex), has to be converted to packet data. Furthermore, there is a subscriber data load for messages and dialogues to the controlling exchange and there is a loss of voice quality because of the conversion of subscriber data from TDM/PCM systems into packet data.

Secondly, messages and dialogues are also prepared at the network gateway between the packet and the TDM network or through a packet-based IVR system especially designed for message and/or dialog function. The message and/or dialogue functions are controlled through a call control server in the exchange that controls the connection. The advantage of this system is that packet-switching data communications networks (packet networks) can be used without the need for any TDM equipment since there is no additional conversion of the subscriber data from a TDM system to packet data.

The disadvantage of this system however is that the exchange that controls the exchange for connections routed to the packet network, has no access to the existing IVR functions in the packet network.

SUMMARY OF INVENTION

The object of the invention is therefore an exchange for a telecommunications network with a message/dialog device to provide messages and/or dialogues for subscribers, in which the message and/or dialogue functions can be used by both the classic telephone network using the TDM method (circuit-switched data communications networks) and a packet network (packet-switched data communications network).

This object is achieved with an exchange for a telecommunications network with a message/dialog device to provide messages and/or dialogues for the subscriber as per the accompanying Claim 1.

The message/dialogue device has an interface for a packet-switched data communications network (packet network) and a circuit-switched data communications network (classic telephone network in the TDM system).

The exchange according to the present invention contains a virtual port, defined on the interface to the packet-oriented data communications network, for connection-oriented control of the functions of the message/dialogue device for a connection routed via the packet-switched data communications network to transfer messages and/or dialogues to a subscriber.

Furthermore, the exchange according to the present invention contains a physical port to transfer messages and/or dialogues through a connection routed via the circuit-switched data communications network to transfer messages and/or dialogues to a subscriber.

The present invention has the advantage that a classic message/dialogue system in a conventional TDM exchange for connections from an external non-TDM data communications network (e.g. a packet network) can be controlled such that in particular existing message and dialogue functions in classic exchanges are available for connections routed via a packet network for the A and/or B-side subscribers, for example standard messages with variable contents, dialogues with DTMF input or voice input from the subscriber.

Furthermore the connection control logic (call control) available in the classic exchange for controlling message or dialogue functions can be used while the subscriber data loaded with message and subscriber input is routed to the packet network.

This avoids unnecessary conversion of the data stream loaded with messages and subscriber inputs to TDM technology and TDM connection technology in the peripheral units of the exchange used for connections routed outside the exchange.

Furthermore, service features and services in a classic exchange that require message and/or dialogue functions for the exchange to control connections routed in the packet network can be made available with minimal development costs.

Preferred embodiments of the present invention are described in the following sub claims.

For a connection routed via the packet-switched data communications network, a control processor transfers the location information of the subscriber received via the virtual port to the message/dialogue device.

The message/dialogue device transfers location information to the subscriber.

The circuit-switched data communications network is for example the public telephone network that transfers voice data using TDM time division multiplex) or PCM (pulse code modulation) methods and the packet-switched data communications network (11) is an IP-based (internet protocol) or an ATM (asynchronous transfer mode) data communications network.

In a packet-switched data communications network the location information can contain the IP address (or ATM cell address) of the subscriber or the message/dialogue device.

BRIEF DESCRIPTION OF THE DRAWINGS

The invention will now be described in more detail using preferred embodiments with reference to the figures in the accompanying drawings. The drawings.

DETAILED DESCRIPTION OF INVENTION

Figure 1:
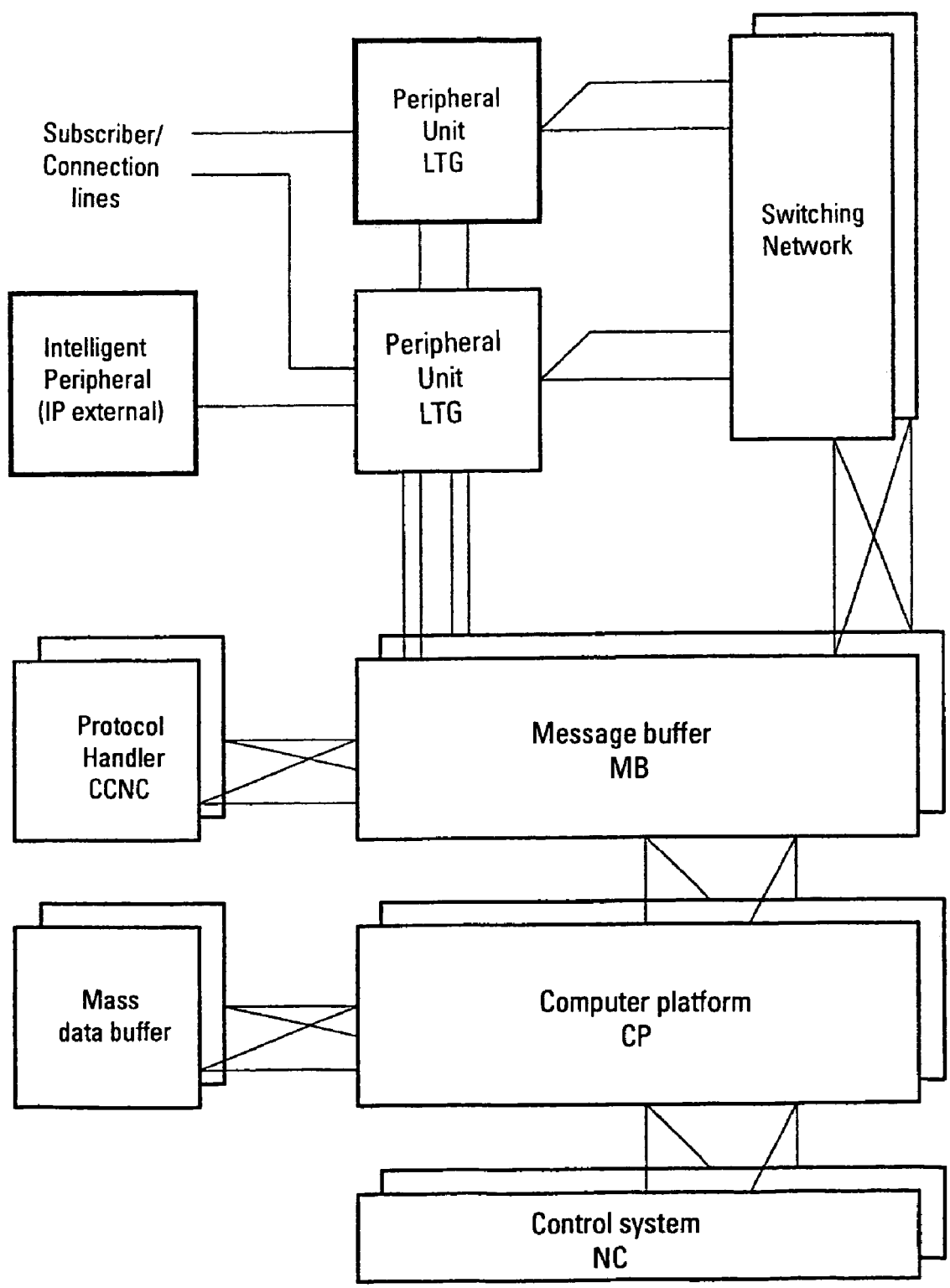
FIG. 1 shows the typical architecture of an exchange system with unduplicated peripheral connection units
Figure 2:
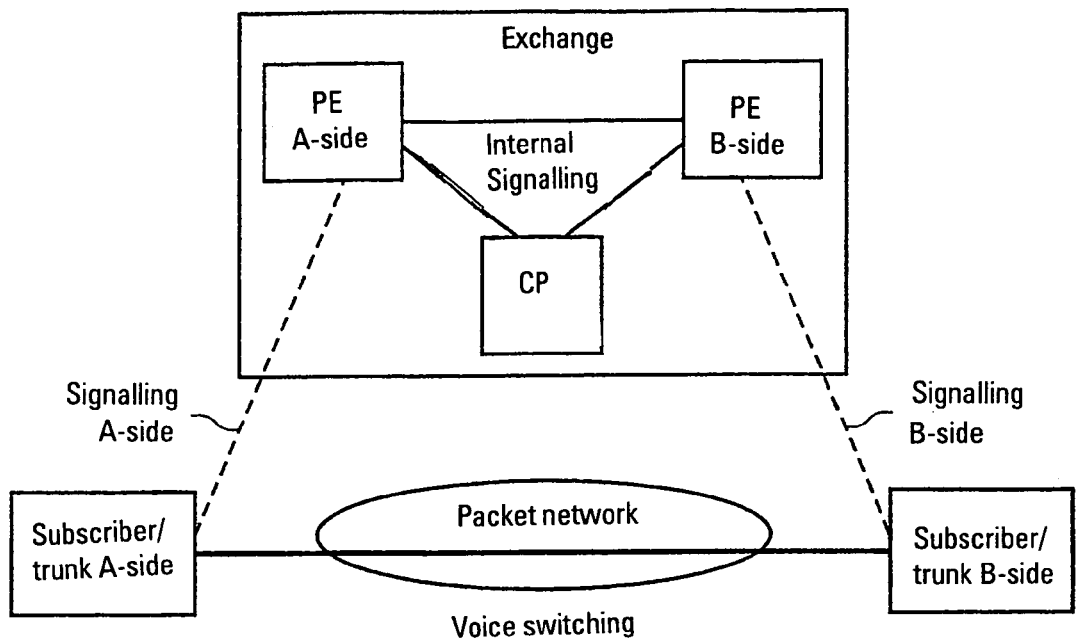
FIG. 2 shows separate routing for voice and signalling
Figure 3:
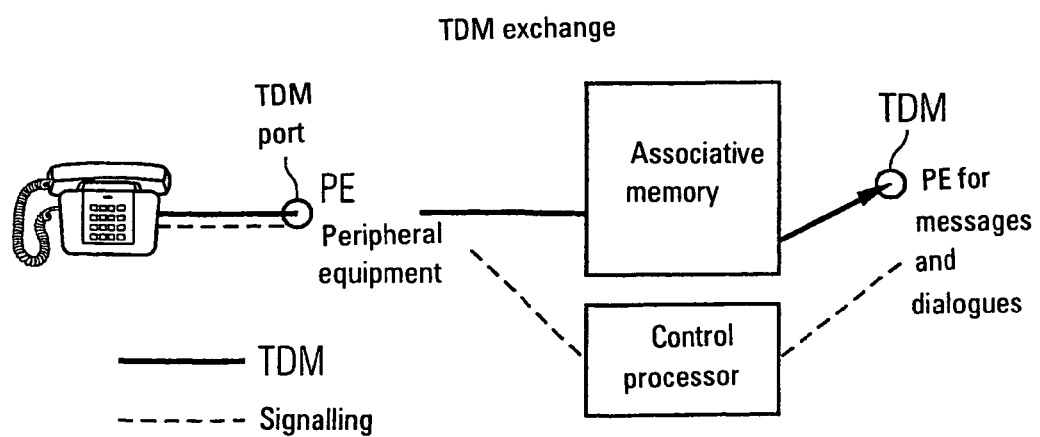
FIG. 3 shows the control of messages in a classic telephone network
Figure 4:
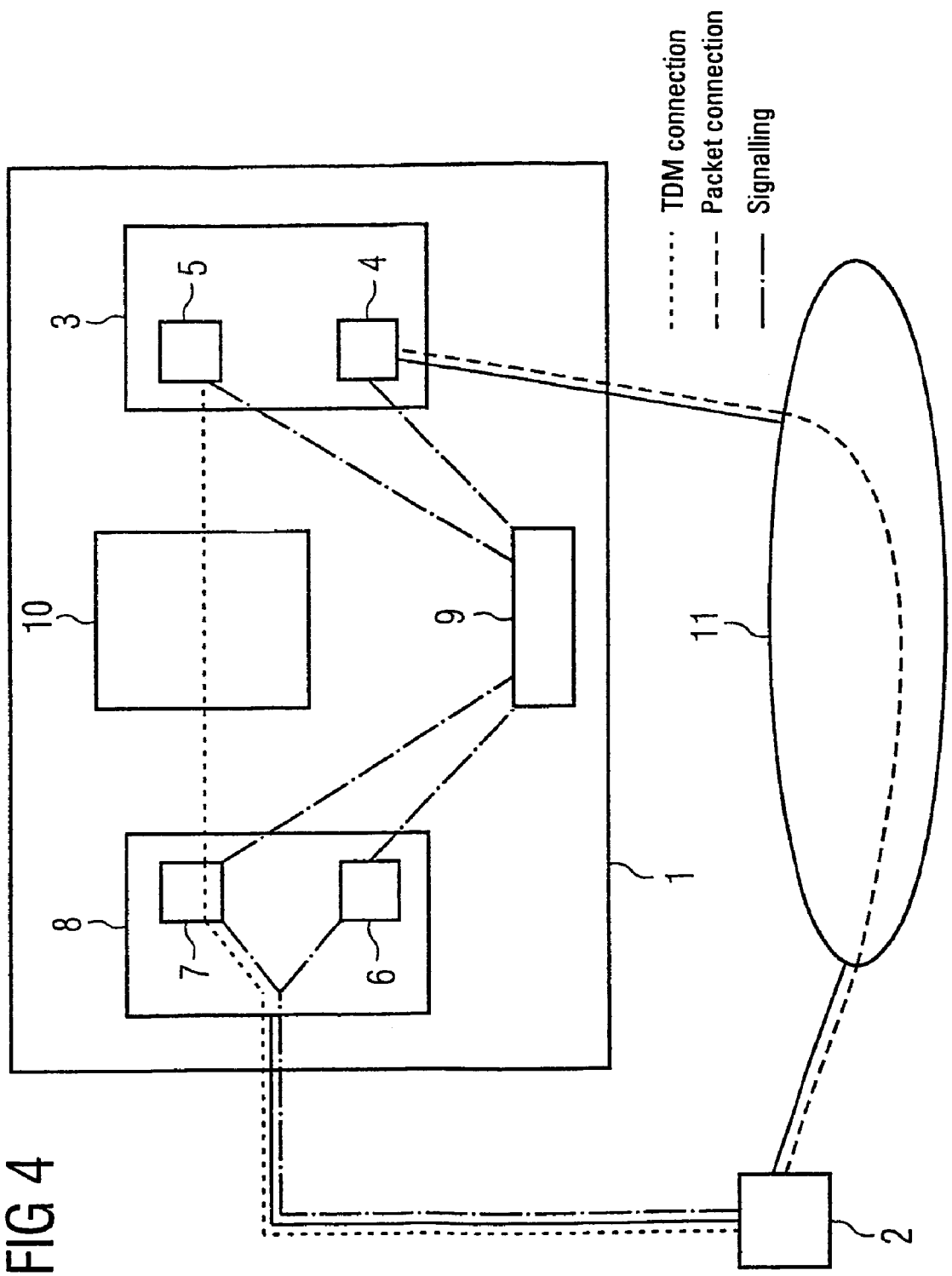
FIG. 4 shows a schematic diagram of an exchange according to the present invention

FIG. 4 shows a schematic diagram of an exchange 1 according to the present invention, whereby FIG. 4 shows both the data transfer of voice data via a packet-switched data communication network 11 and also via a circuit-switched data communications network between a subscriber 2 and a message/dialogue device.

In the first example, the voice data (e.g. a message, a dialogue, tones etc) is transferred between the subscriber 2 and the message/dialogue device 3 via a classic telephone connection using the TDM method. In the example shown transfer between the message/dialogue device 3 (B-side) with the peripheral equipment of the subscriber (A-side, peripheral subscriber equipment 8) takes place within the exchange 8, however for the sake of simplicity we talk about transfer via the circuit-switched data communications network.

For transfer via a circuit-switched data communications network a physical port 7 is seized in the peripheral subscriber equipment 8. An associative memory 10 (also switching network) sets up the connection between the peripheral subscriber equipment and the message/dialogue device. The data is then transferred between the subscriber 2 and the message/dialogue device via the peripheral subscriber equipment 8, the associative memory 10 and the interface 5 to the circuit-switched data communications network (TDM interface 5) of the message/dialogue equipment 3 (shown in FIG. 4 as a dotted line). The connection (e.g. setting up and clearing down the connection, type of message, etc) is controlled through signalling (shown as a dot-dash line) from a control processor 9.

In the second example, the voice data is transferred via a packet-switched data communications network 11 (packet network 11) e.g. via IP protocol; shown in FIG. 4 as a dashed line. For this purpose, the message/dialogue equipment 3 has an interface 4 to the packet network 11.

In accordance with the present invention, the peripheral subscriber equipment 8 has a virtual port 6 to control the data transfer via packet network 11. The virtual port 6 thereby creates a control entity to control the message/dialog functions, to control the connection (e.g. through transferring the location information).

The virtual port 6 according to the present invention is not designed a hardware; this avoids the need for a physical termination of a physical port of the peripheral subscriber equipment 8 as is required in the state of the art. The signalling required to control the connection via a packet-switched data communications network is also shown by a dot-dash line.

In accordance with the present invention message and dialogue entities of a TDM exchange (exchange 1) are made equally useable for both TDM connections (circuit-switched connections) and for non-TDM connections e.g. in packet networks 11.

This means that the call control of non-TDM connections from a control entity resident in the TDM exchange 1 is controlled such that the unit used for messages and dialogues in the TDM seemingly operated a TDM connection. This is achieved by introducing the previously described virtual ports that possess a control unit but no physical representation in the TDM exchange 1.

Figure 5:
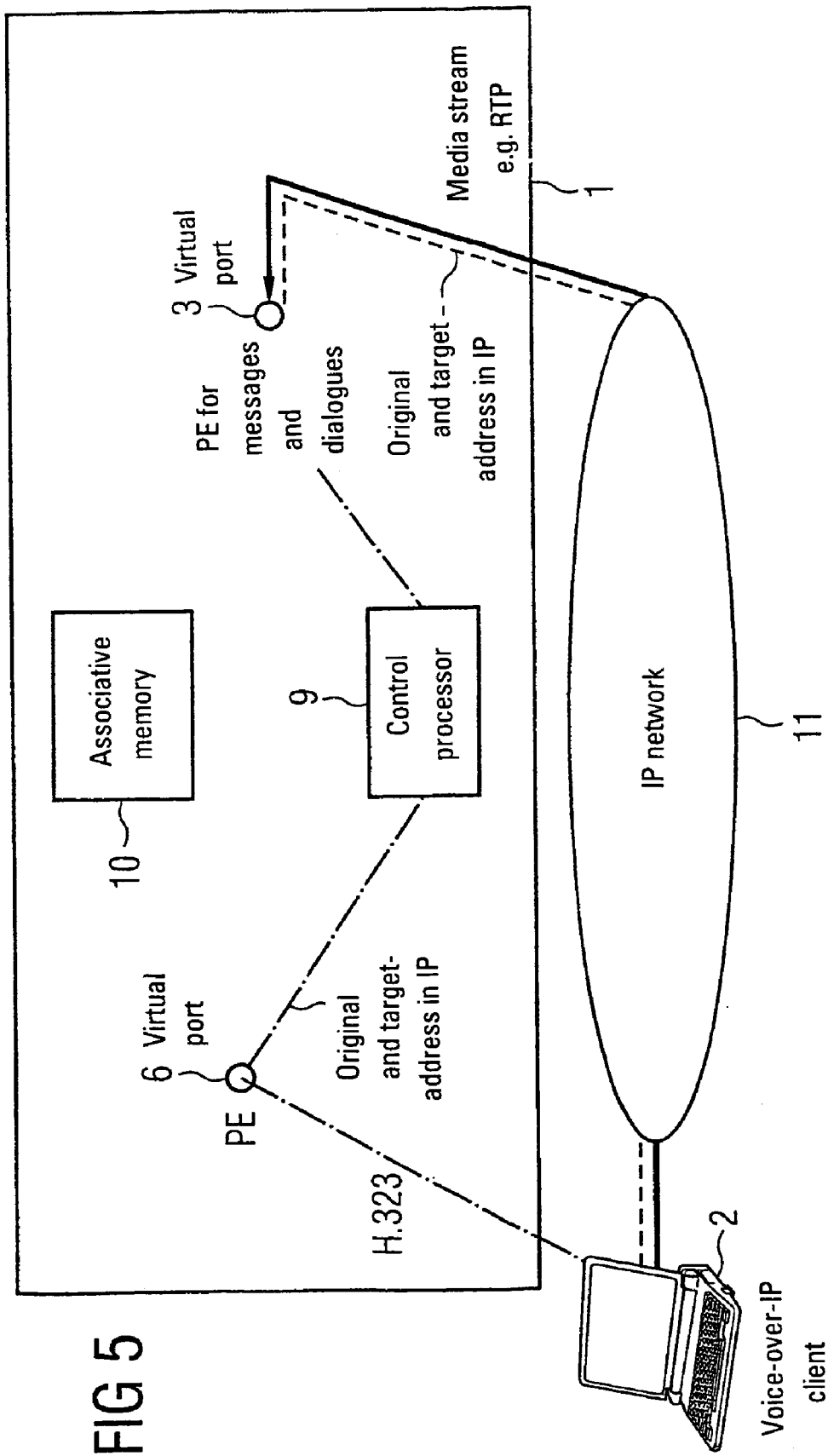
FIG. 5 shows a schematic diagram of data transfer via a connection via a packet-switched data communications network

A non-TDM connection is accordingly assigned to a virtual port 5, as shown in FIG. 5 (the numbering from FIG. 4 is retained in FIG. 5). The call control entity of the virtual port 6 seizes a physical available message/dialogue port and controls the required function (e.g. 'prompt and collect') as a standard physical TDM port of the exchange 1. The novelty is that this message/dialogue port forms an additional packet data access (incoming and outgoing) that is used in the event of a connection from the packet network e.g. RTP data streams (real time protocol) to send (such as 'prompt') and receive (such as 'collect').

The control program of the virtual port 6 which forms the A-side of the packet data connection has no physical representation in the exchange 1, does however recognise the location of the A-side in the packet network (e.g. IP address). This 'new' information is transmitted in the message playback of the control entity of the relevant port of the message/dialog unit which does not control the TDM port as in the TDM application case by activates and controls the alternative packet data access (interface to the packet-switched data communications network).

The packet-activated control entity of the message/dialogue device transmits to the virtual port of the other part the location of the packet data access (e.g. IP address) so that the media stream to both communication points in the packet network can be controlled.

In principle, a distinction is made between the two different applications for the virtual ports that however remain transparent for the message/dialogue equipment.

Figure 7:
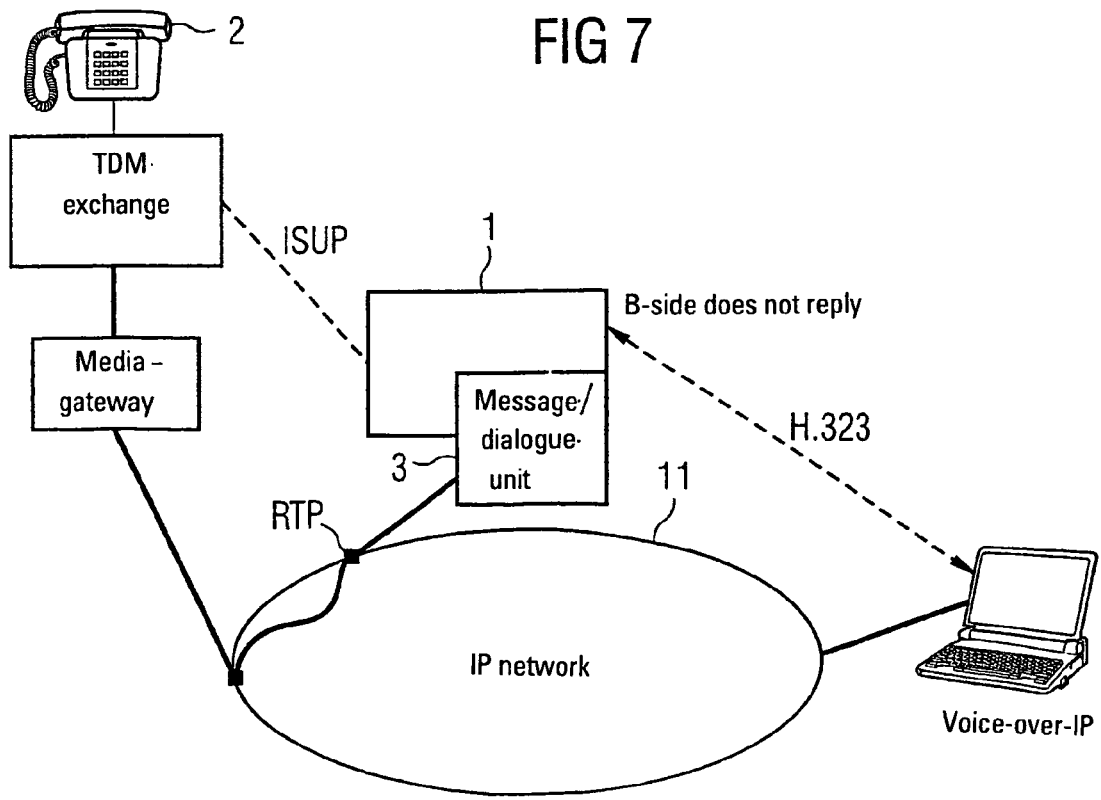
FIG. 7 shows a further example of data transfer via a packet-switched data communications network

For connections from the packet network into a TDM network (circuit-switched data communications network), the control program of the virtual port on the A-side informs the partner entity from the message and dialog unit of the location of the peripheral unit (e.g. media gateway) associated with the * that acts as an interface between the circuit-switched and packet-switched data communications network and converts the packet data stream in to TDM to TDM voice information into a packet media stream, as shown in FIG. 7**.

Figure 6:
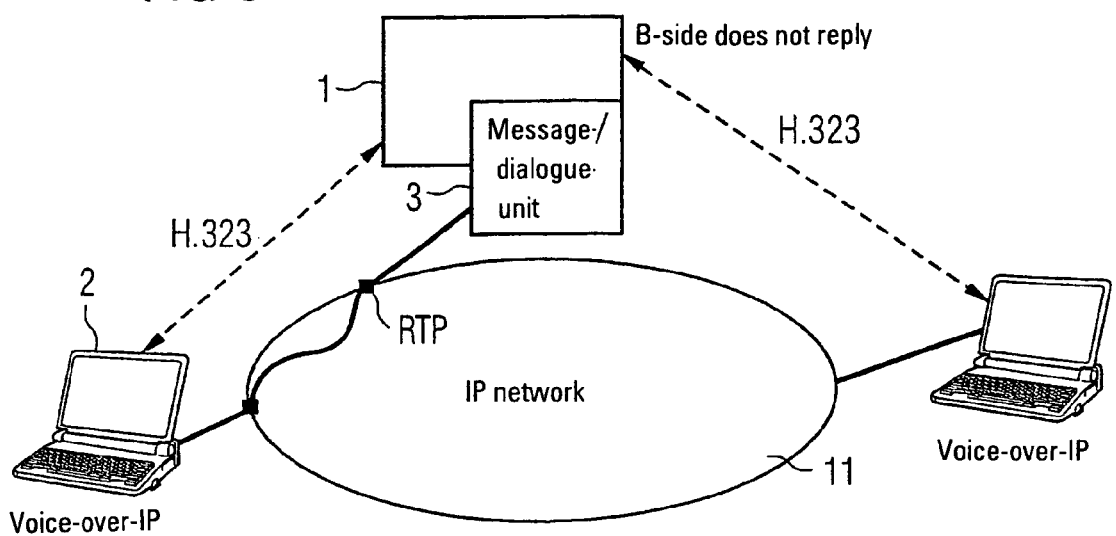
FIG. 6 shows an example of data transfer via a packet-switched data communications network

In the event that the remote subscriber is also a packet-network subscriber (IP/IP call) the address of the remote subscriber is automatically sent in the message traffic, as shown in FIG. 6.

The present invention enables cost-effective use of a message and dialogue system that may already exist in the TDM network (circuit-switched data transmission network) for voice traffic in the packet data network. The existing system must only be simply adapted as described.

Furthermore, the system is highly scaleable since each message port can in principle be assigned to a TDM or data network (or packet network) connection. A further advantage is the system-related similarities of the message or dialogue processes for packet network and for TDM subscribers, as well as the same administration of the messages or dialogues for circuit-switched and for packet-switched data communications networks i.e. there is no longer a need to synchronise different systems.

All these functions are achievable for the packet data network without the need for additional TDM connections, loops or similar. The media data remains entirely in the packet data network. Service features and services of a classic TDM exchange that concern message and dialogue functions can be used synergetically for the packet data network without additional outlay or with only minimal outlay.

It is a characteristic of the present invention that an existing message and dialog unit in the TDM network can be assigned additional packet data accesses without the need for the communicating system in the TDM exchange having to be specially adapted.

The adaptation is concentrated mainly on the introduction of location information (e.g. IP addresses that must be considered in the message playback. Irrespective of the message topic (location available→'new handling for data networks' or location not sent→'classic handling (TDM)') new program parts of the message/dialogue unit are executed. Alternatively this can however be used statically. Specific TDM message pots are set up on the TDM-based message system for TDM traffic and virtual IP ports administered for IP messages and dialogues.

In the example shown in FIG. 6 the classic TDM message and dialogue entity is set for a pure IP connection in an exchange. Noteworthy is that there is no TDM connection line or signalling. Both the signalling (e.g. to the standard H.323) and the media stream (RTP) are transferred as IP packets.

FIG. 7 shows the example of a voice connection between a PSTN (Public Switched Telephone Network) subscriber and an IP subscriber. The same applies here as described in FIG. 6 the subscriber is simply routed from the PSTN using a trunk media gateway to the IP network.

The invention claimed is:

1. An exchange for a telecommunications network, comprising:
   a message/dialogue device to provide audible messages for subscribers whereby the message/dialogue device has an interface each for a packet-switched data communications network and a circuit-switched network;
   a virtual port defined on the interface for packet-oriented data communications network for connection-oriented control of the message/dialogue device for a connection routed via the packet-switched data communications network to transfer audible messages to a subscriber; and
   a physical port to transfer messages for a connection routed via the circuit-switched data communications network to transfer audible messages to a subscriber.

2. An exchange according to claim 1, wherein a control processor transfers location information of the subscriber that is received via the virtual port to the message/dialogue device.

3. An exchange according to claim 1, wherein the message/dialogue device or the control processor sends location information to the subscriber for a connection routed via the packet-switched data communications network.

4. An exchange according to claim 1, wherein the circuit-switched data communications network of the public telephone network and the packet-switched data communications network is an IP based data communications network.

5. An exchange according to claim 2, wherein the location information contains the IP address of either the subscriber or the message/dialogue device.

6. An exchange according to claim 2, wherein the message/dialogue device or the control processor sends location information to the subscriber for a connection routed via the packet-switched data communications network.

7. An exchange according to claim 2, wherein the circuit-switched data communications network of the public telephone network and the packet-switched data communications network is an IP based data communications network.

8. An exchange according to claim 3, wherein the circuit-switched data communications network of the public telephone network and the packet-switched data communications network is an IP based data communications network.

9. An exchange according to claim 3, wherein the location information contains the IP address of either the subscriber or the message/dialogue device.

10. An exchange according to claim 4, wherein the location information contains the IP address of either the subscriber or the message/dialogue device.

11. An exchange according to claim 1, wherein the message/dialogue device further provides interactive dialogues for subscribers.

12. An exchange according to claim 1, wherein the audible message is in an audible language understood by the subscribers.

13. An exchange for a telecommunications network, comprising:
    a message/dialogue device to provide dialogues for subscribers whereby the message/dialogue device has an interface each for a packet-switched data communications network and a circuit-switched network;
    a virtual port defined on the interface for packet-oriented data communications network for connection-oriented control of the message/dialogue device for a connection routed via the packet-switched data communications network to transfer dialogues to a subscriber; and
    a physical port to transfer dialogues for a connection routed via the circuit-switched data communications network to transfer dialogues to a subscriber.

14. An exchange according to claim 13, wherein a control processor transfers location information of the subscriber that is received via the virtual port to the message/dialogue device.

15. An exchange according to claim 13, wherein the message/dialogue device or the control processor sends location information to the subscriber for a connection routed via the packet-switched data communications network.

16. An exchange according to claim 13, wherein the circuit-switched data communications network of the public telephone network and the packet-switched data communications network is an IP based data communications network.

17. An exchange according to claim 13, wherein the message/dialogue device further provides audible messages for subscribers.

18. An exchange according to claim 13, wherein the audible message is in an audible language understood by the subscribers.

* * * * *